United States Patent [19]

Alford

[11] 4,068,236
[45] Jan. 10, 1978

[54] MONITOR FOR TWO FREQUENCY LOCALIZER GUIDANCE SYSTEM

[76] Inventor: Andrew Alford, 120 Cross St., Winchester, Mass. 01890

[21] Appl. No.: 699,237

[22] Filed: June 24, 1976

[51] Int. Cl.² .............................................. G01S 1/16
[52] U.S. Cl. ................................ 343/108 R; 343/107; 343/109
[58] Field of Search ............. 343/108 R, 109, 100 SA, 343/107

[56] References Cited

U.S. PATENT DOCUMENTS

| | | | |
|---|---|---|---|
| 3,711,857 | 1/1973 | Cummings | 343/109 |
| 3,713,160 | 1/1973 | Becavin | 343/108 R |

OTHER PUBLICATIONS

The Radio Amateur's Handbook, 50th Ed., Newington, Conn., American Radio Relay League, 1973, pp. 533-535.

Primary Examiner—Maynard R. Wilbur
Assistant Examiner—Richard E. Berger

[57] ABSTRACT

A monitoring arrangement for use in a two frequency localizer guidance system using a single antenna array is disclosed. This monitoring arrangement is designed to provide monitoring signals equivalent to those that would be provided by monitors located at a distant point on the course and at a distant point located at a selected angle off the course. Additional monitoring for the clearance transmitter signals and means for determining the existence of major faults such as short circuits or open circuited lines or major injuries to the equipment.

5 Claims, 8 Drawing Figures

DETECTOR
VIEW A

DETECTOR
VIEW B

DETECTOR
VIEW C

MONITOR FOR TWO FREQUENCY LOCALIZER GUIDANCE SYSTEM

The present invention relates to two frequency localizer signaling systems for guiding an aircraft along a prescribed course of the type described in U.S. Pat. No. 2,682,050.

This invention is also closely related to the invention described in my U.S. Pat. No. 3,866,228. This patent describes a two frequency localizer guidance system in which only one array is used to radiate two narrow intersecting beams that are normally formed by the course array (main array), and two wide intersecting clearance beams ordinarily formed by the clearance auxiliary array. The arrangement for combining the signals from the course array transmitter with the signals from the clearance array transmitter for transmission into a single array without causing interference between the transmitters is accomplished with the aid of the common aperture combining network described in the said U.S. patent.

The present invention deals with the monitoring systems which may be used in combination with the common aperture combining network for monitoring the signals delivered to the common aperture network from the clearance signal transmitter.

The signals delivered from the clearance transmitter to the combining network, after being combined with the signals from the course transmitter, are usually weaker than the signals from the course transmitter. Under such conditions, it is difficult to monitor them because the capture effect in detectors tends to make them respond only to the stronger course transmitter signals. For these reasons, it is desirable to arrange for monitoring the clearance array signals either just before they are combined by the directional couplers with the signals from the course transmitter or, if possible, to monitor them in some other part of the circuit where the clearance transmitter signals are already combined with the course transmitter signals, but in a ratio which gives preference to the clearance transmitter signals. In the present invention, four different systems for monitoring the signals from the clearance transmitter are described. One system comprises the use of directional "extraction" couplers which extract a small portion of the clearance signals just prior to their entry into the combining couplers.

These extracted signals are added in star combiners. The sums of these signals obtained from the star combiners are fed to detectors where they are demodulated to obtain the usual demodulation products, namely, mixtures of DC with 90 and 150 cycles, with the usual ad-mixture of harmonics and of cross modulations products. The magnitude of the DC current is used as a measure of the total signal received from the total signal received from the clearance transmitter. The amplified 90 and 150 cycle components, after amplification and filtering are rectified separately and their magnitudes compared to each other.

In another embodiment of the invention, the extraction couplers are inserted into the load lines of the combining couplers, that is, between these couplers and the loads into which the unused portions of the signals are dumped. In this embodiment of the invention, the extraction couplers are again connected to the star combiner in which the signals are added and fed to a detector as in embodiment 1. In a third embodiment of the invention, some of the extraction couplers are placed as in embodiment 2 and others as in embodiment 1. These and other embodiments of the invention will be described in connection with the figures.

DESCRIPTION OF EMBODIMENTS OF THE INVENTION

Figure 1:
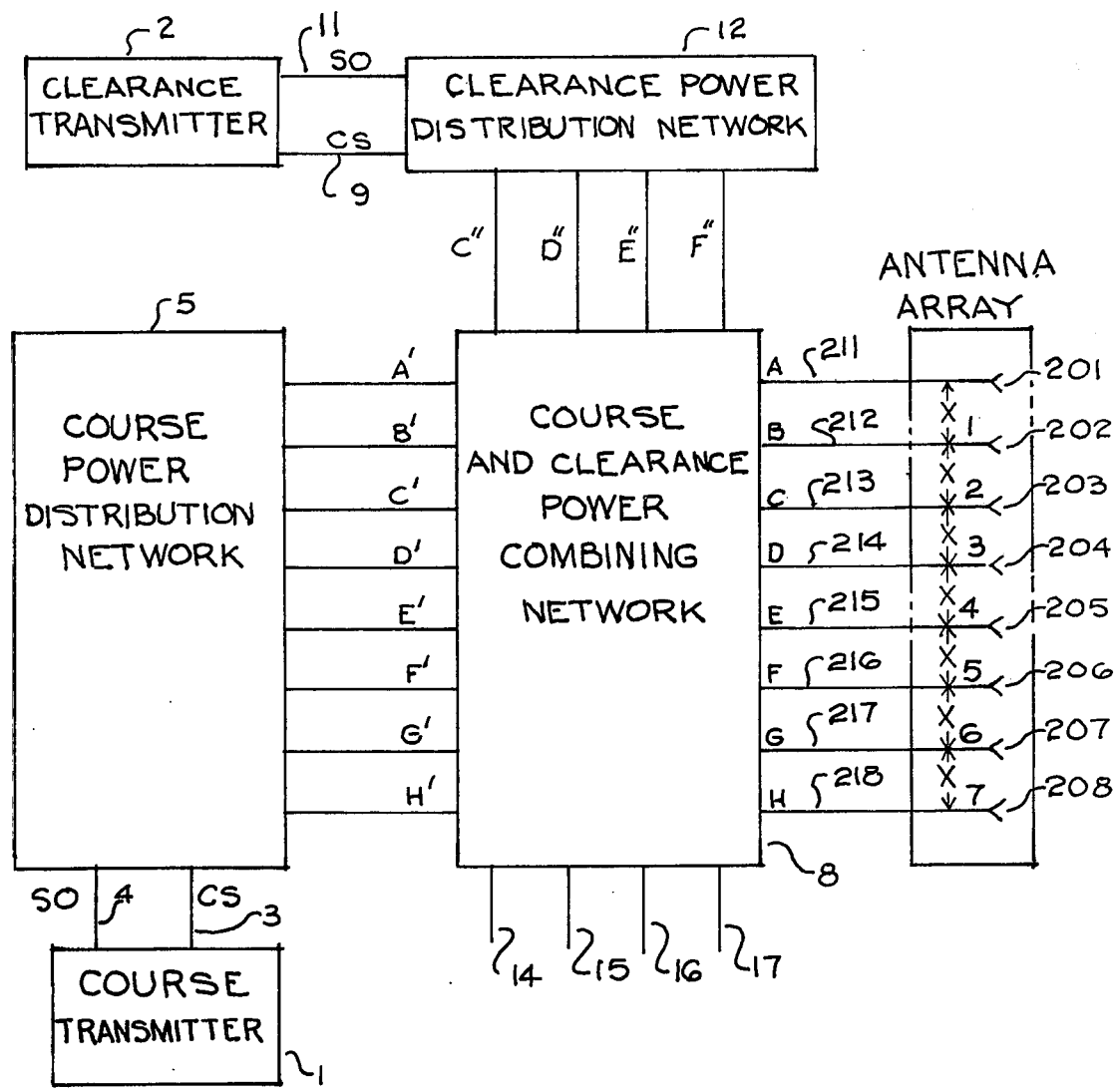
FIG. 1 is a block diagram showing the principal networks used in a two frequency localizer using a single antenna array.

In FIG. 1. is shown a general arrangement for feeding an eight element localizer array with power from the "course transmitter" and "the clearance transmitter." In this figure, numeral 1 refers to the course transmitter which supplies the power distribution network 5, with the so called CS and SO signals, through transmission lines 3 and 4. According to the well established use, SC stands for sidebands only and CS stands for carrier and sidebands. The power distribution network which distributes the power from the course transmitter usually consists of power dividers and hybrids described in detail in my U.S. Pat. No. 3,866,288. The power distribution network 5 shown in FIG. 1 has eight outputs. If these outputs were connected through transmission lines of equal lengths to an eight element array, this array consisting of eight antennas such as for example those described in U.S. Pat. Re. No. 25,035 would radiate two narrow intersecting beams defined by the sidebands. The line of intersection of the two beams would normally be directed along the center line of a runway. The design of the power distribution network for the course array is generally such as to make the intersecting localizer beams as narrow as possible so as not to illuminate objects such as hangars and other airport structures which may reflect signals and thus produce bends in the course. When the beams are made very narrow, the information given the airplane outside the beams may be confusing and it is, therefore, necessary to provide to provide two wider intersecting beams which are usually radiated by a separate clearance array energized by the clearance transmitter.

In FIG. 1 a clearance transmitter 2 supplies CS and SO clearance signals to distribution network 12 through lines 9 and 11. The clearance power distribution network has four outputs which, if they were connected by lines of equal lengths to a four element array, would provide two wide intersecting beams. These "clearance array beams" would provide an approaching airplane with proper information over a wide sector centered on the runway.

This array is supplied with power in both the clearance power distribution network 12 and from the course power distribution network 5. The clearance signals are supplied to the combining network 8 through lines C", D", E", and F". The course signals are supplied from the distribution network 5 through lines A' through H'. The course and clearance power combining network of this invention has two kinds of outputs. Radio frequency transmission lines which supply the individual antenna elements in the array such as A, B, C . . . .,H which supply an eight element antenna array, and several monitoring line output lines through which DC and audio frequency signals are sent to a central point where they may be amplified and used to operate relays or indicators as may be desired. Monitor output lines or outputs carrying radio frequency signals may also be used under certain circumstances as will be explained later.

Figure 2:
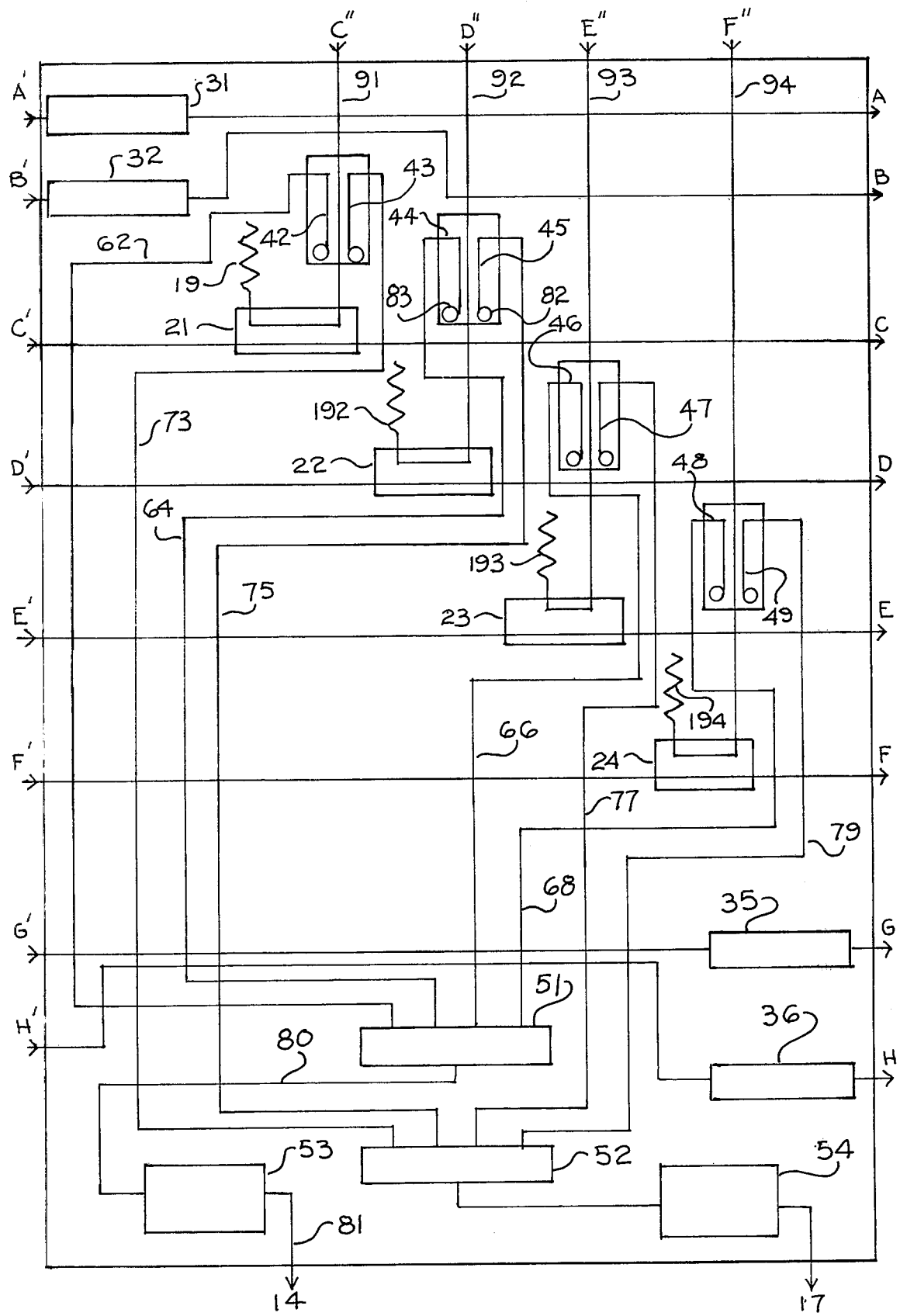
FIG. 2 is a block diagram of the course and clearance power combining network showing an arrangement for monitoring the clearance signals by means of anterior couplers.

FIG. 2 shows the course and clearance power combining network. The power from the course power distribution network arrives through transmission lines A', B', C' . . . .,H', and is transmitted to antenna feeders A, B, C, . . .,H. The power arriving through transmission lines A', B', passes through attenuators 31 and 32 before proceeding directly to antenna feeders A and B. Power arriving along transmission line C' passes through directional coupler 21 before proceeding to antenna feeder C. Similarly, power arriving along transmission lines D', E', , F', also passes through similar directional couplers 22, 23, and 24 before proceeding directly to the corresponding antenna feeders D, E, and F. Power arriving along transmission lines G' and H' passes through attenuators 35 and 36 before proceeding to the antenna feeders G and H. The attenuators 31, 32, 35 and 36 are made to have the same attenuation as that which is experienced by the power passing through directional couplers such as 21, 22, 23 and 24. As an example, in a localizer designed to operate in the frequency range 108 to 112 MHz, 6 dB directional couplers may be designed to have a loss around 1 dB and, correspondingly, attenuators such as 31 and 32 would also be designed to have similar losses. Up to this point, the system is similar to that described in my co-pending application Ser. No. 344,358. According to the present invention, directional couplers such as 42, 43, 44, 45, 46, 47, 48, and 49 are added to the course and the combining network so as to provide monitoring signals that could be used to indicate the proper operation of the clearance transmitter, the clearance distribution network, and of the transmission lines such as C', D', E', and F' carrying RF signals to the combining network.

Figure 3:
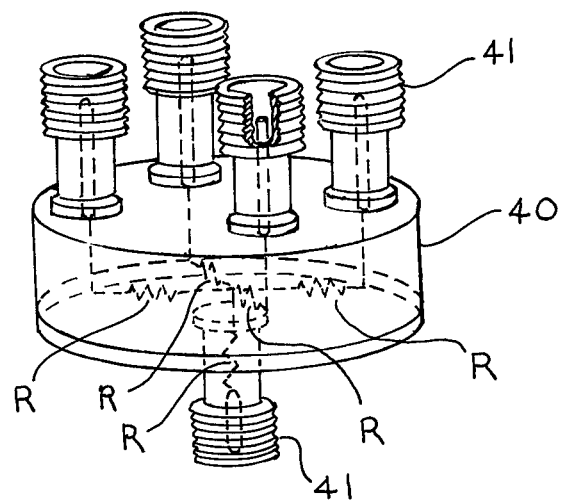
FIG. 3 is a diagrammatic drawing of a star network used in the monitoring network in FIG. 2 and in other figures.

One way to obtain useful monitoring information from the monitoring couplers is by adding them, for example, in what will be referred to as Star Network, such as Network 51, shown in FIG. 3. The Star Network shown in FIG. 3 comprises a metal housing 40 on which are mounted a plurality of coaxial connectors such as connector 41. The outer conductors of these connectors are electrically connected through the housing. The inner conductors are all connected together at a point through resistors such as resistor R-all having equal values computed from the following formula:

$$R = N - 2/N \; Z_o$$

Where

R is the value of the resistance in ohms $Z_o$ is the characteristic impedance of the coaxial transmission lines connected to the star N is the total number of lines connected to the star network.

Radio frequency transmission lines 62, 64, 66 and 68 carry the RF signals extracted by couplers 42, 44, 46, and 48 to Star Network 51. The combined output of Network 51 is carried by radio frequency line 80 to detector 53 where radio frequency signal is demodulated and the combination of the circuit current with audio frequency signals, such as 90 and 150 Hertz, together with other demodulation products are conveyed by cable 81 to a remotely located conventional monitor network, which compares the signals with their normal values and causes a shut down of the system, when the deviation of their magnitudes, from the standard values, exceeds certain prescribed limits.

The type of signal which is obtained through the action of the Star Combiner depends on the relative electrical lengths of the paths which carry the RF signals from the points of entry into the combining network to the extracting couplers and from there to the combiner. Thus, the lengths of paths which have to be compared with each other are such paths as the length of line 91 carrying the signal from the entrance into the combining network to coupler 42, plus the length of the transmission line 62 carrying signal from coupler 42 to Star Combiner 51. This path S consisting of lines 91 and 62 is to be compared with the path S' consisting of lines 92 and 64. A third similar path S" consists of lines 93 and 66. The fourth path S" is the sum of lines 94 and 68. If these paths S, S', S", S'" are made equal to each other, the radio frequency signals arriving in the same relative phases along C", D", E", and F" at the entrances to the combining network, will also arrive in equal relative phases at the entrances to the Star Network 51. The resultant RF signal delivered by the Star Network 51 to the demodulator 53 through transmission would have the same composition as the signal that would be received at a distant point along the course of the four element localizer cleaarance array, if the array were supplied directly by lines E", F", G", and H" from the clearance power distribution network 12 in FIG. 1.

It is preferable to cut the transmission line lengths in the combiner network that in such a way the total path lengths from the entrance of lines C" into the combiner network to the exit of line C, from the network is equal to the path length from entrance of line D" to the exit of line D and this path, in turn, is equal to the path lengths from the entrance of line E" to the exit of line E, which path is also equal to the path from the entrance of F" to the exit of line F.

When the transmission lines are cut in this way, the phase equality is preserved so that when pads S, S', S", S'" are made equal to each other, the Star Network 51 delivers a replica of the on-course signal received at a distant point from the antenna array in FIG. 1 provided that the lengths of lines between the course and clearance power combining network and the individual radiating elements of the array are made equal to each other.

Extraction couplers 43, 45, 47 and 49 are connected to Star Network 52 through transmission lines 73, 75, 77, and 79. The path lengths such as Q comprising lines 91 and 73, Q' comprising line lengths 92 and 75, etc, are made equal to each other except for predetermined differences in lengths between consecutive paths such as Q, Q', Q'', Q''' are calculated as will be described.

Path Q is associated with coupler 43 which monitors line 91 that feeds line C-C''. This same line continues as line 213 in FIG. 1 to antenna element 203. Thus path Q is associated with the antenna element 203 in the sense that path Q conveys some of the monitor signal derived from the portion of the clearance transmitter power a fraction of which is fed into the antenna element 203.

In this sense, path Q' is associated with antenna element 204, path Q'' is associated with antenna element 205 and path Q''' with element 206.

The path differences (Q'-Q) = $X_3 \sin\theta$ space wavelengths where $X_3$ is the distance between the elements 204 and 203 as measured at right angles to the course in space wavelengths. Similarly, the path difference (Q''-Q') = $X_4 \sin\theta$ where $X_4$ is the distance between antenna elements 204 and 205. Other similar path length differences are calculated in the same way. In these calculations, angle $\theta$ is the angle between the course and the direction $\theta$ in which one wishes to monitor the signal. This direction as was observed from localizer antenna.

Figure 4:
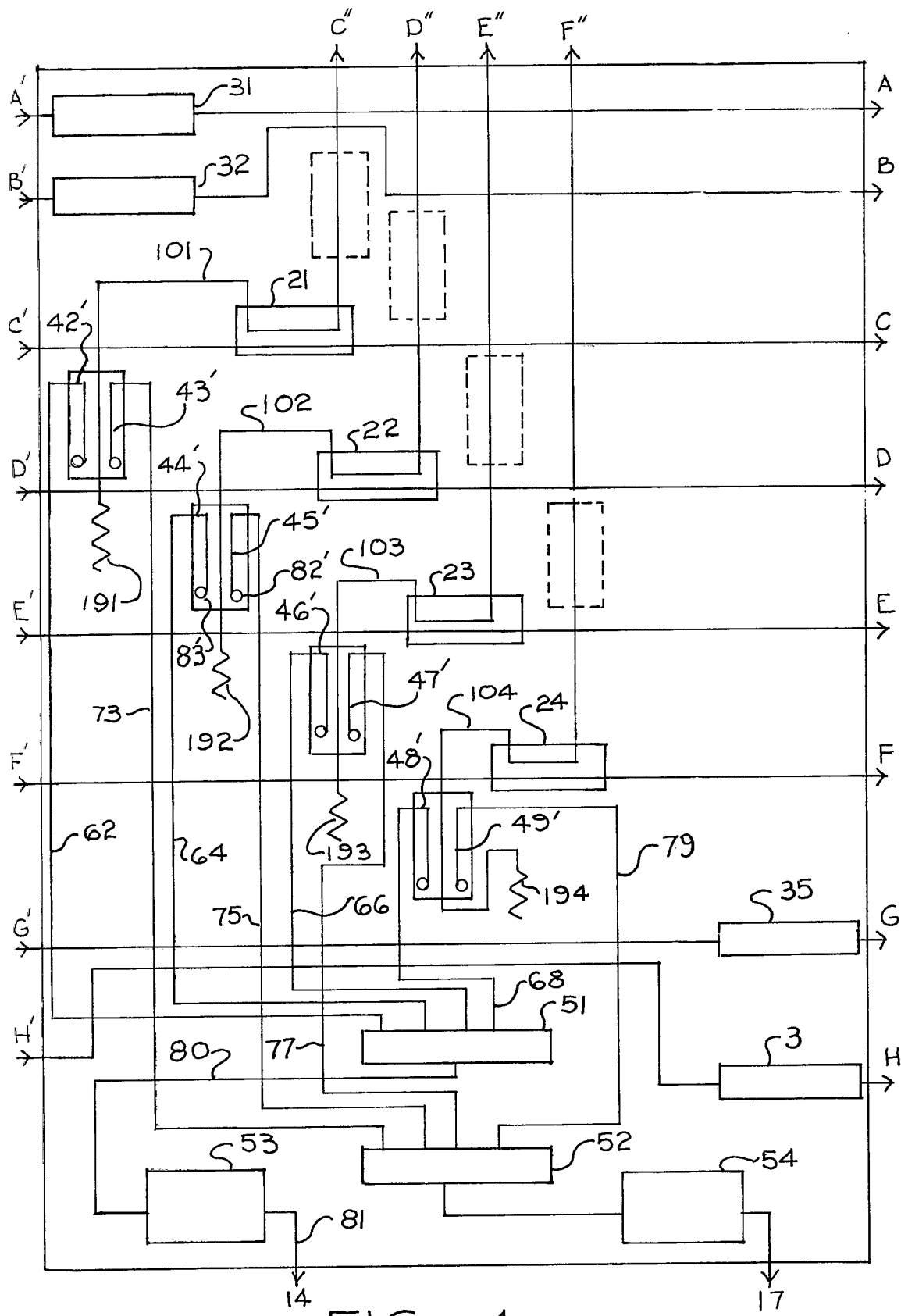
FIG. 4 shows another arrangement for monitoring clearance signals using posterior couplers.

In FIG. 4, is shown another embodiment of the invention. The combining network shown in FIG. 4 is similar to that shown in FIG. 2 except that couplers 42, 43, 44, 45, 46, 47, 48, and 49 have been moved to new positions indicated by numerals 42', 43', . . ., 49'. The corresponding positions of the couplers in FIG. 2 are indicated in FIG. 4 by rectangles drawn in dashed lines. When the coupling values of couplers 21, 22, 23, and 24 are around 6 dB, one-quarter of the power entering line F'' is transmitted to F and three-quarters of the power is sent through couplers 48, 49, with most of the power being dissipated in matched terminations such as 194, 193, 192, 191. This means that the clearance transmitter power passing through monitoring couplers 42', 43', 44', . . ., 49' in FIG. 4 is equal to approximately three-quarters of the power passing through monitoring couplers 42, 43, . . . 49 in FIG. 2. Transmission lines such as C' - C; D' - D; E' - E and F' - F carry the power from the course power distribution network as well as the power from the clearance transmitter. One-quarter of the course transmitter power arriving at C' from the course power distribution network is diverted by the coupler 21 into line 101, where it is mixed with a fraction of the power arriving from the clearance transmitter.

The resultant power whch is a mixture of power from both the clearance and the course transmitters is largely dumped in termination 191. A small portion of it, however, is extracted by couplers 42, 43 and is sent to the star networks 52, 51. A convenient value of coupling for such couplers 42, 43, 44, etc. is around 14 dB. It could, of course, be tighter or looser as may be desired, for convenience of processing the final signals delivered by detectors 53, 54. The principles which are used in selecting the lengths of lines to be used between such couplers 42', 44', 46', and 48' and combiner 51, as well as the computation of the differences in the path lengths to be used by the couplers 43', 45', 47', 49', and star network 52 are the same as those which have already been explained in detail in connection with the arrangement in FIG. 2. It will be convenient to refer to the monitor couplers in FIG. 2 as being in anterior positions. They are anterior couplers in the sense that the currents arriving from the clearance power distribution network go through these couplers first before being combined with the signals from the course transmitter. Such couplers will be referred to for convenience simply as anterior couplers. The couplers shown in FIG. 4 such as 42', 44', 45', etc. are all posterior couplers in the sense that the clearance signal passes first through the combining couplers and, only then, through these posterior monitoring couplers. The monitoring couplers in FIG. 4 will, therefore, be referred to as posterior couplers.

The anterior couplers can be used to monitor the clearance signals alone because the directional couplers such as 21, 22, 23, 24 transmit very little of the course transmitter signals into these anterior couplers.

Figure 5:
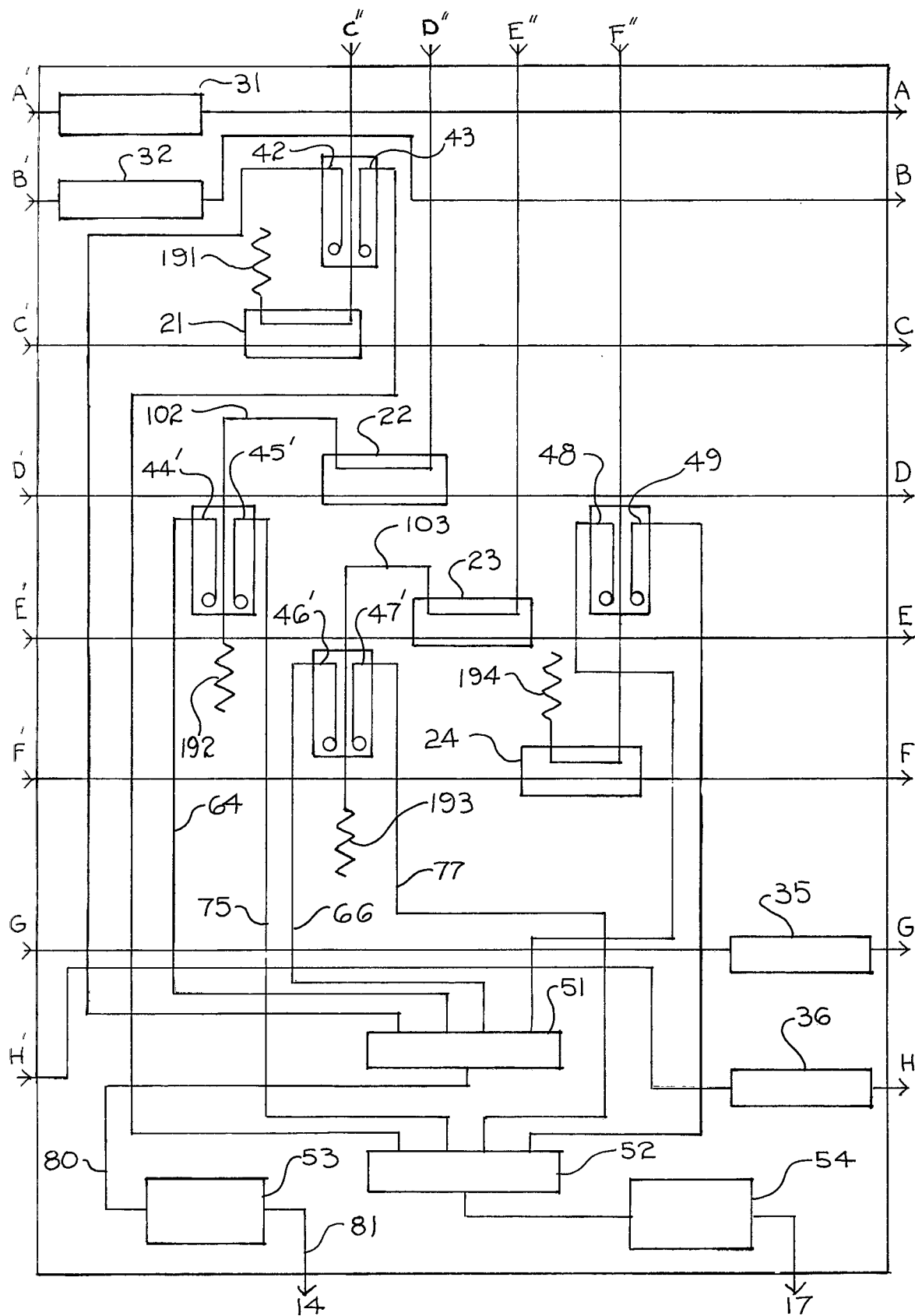
FIG. 5 is still another arrangement for monitoring clearance signals using both anterior and posterior couplers.

The only disadvantage of anterior couplers is that they do not monitor the sections of lines which, after passing through these couplers proceed to the mixing couplers such as 21, 22, etc. Also, what happens within these mixing couplers is not fully monitored. The posterior couplers have the advantage of monitoring the clearance signals after they pass through the mixing couplers, therefore, could be used to monitor any faults that may occur in the monitoring signal paths. Unfortunately, this is not always possible because with posterior couplers one is monitoring mixtures of both clearance and course transmitter signals. Because of the capture effects in the detectors which is effectively monitored by these couplers is always the strongest signal. In large arrays with certain types of power distribution, it is possible to use posterior couplers to monitor some lines and anterior couplers to monitor other lines. Such an arrangement is shown in FIG. 5 in which two anterior couplers and two posterior couplers are used. Such a mixed arrangement is believed to be desirable, for example, in the case where a fourteen element array is used as a course array and at the same time its six central elements are also used as a clearance array. In each particular case, the positions of the monitoring couplers should be selected on the basis of the power distributions that will be used.

Figure 6:
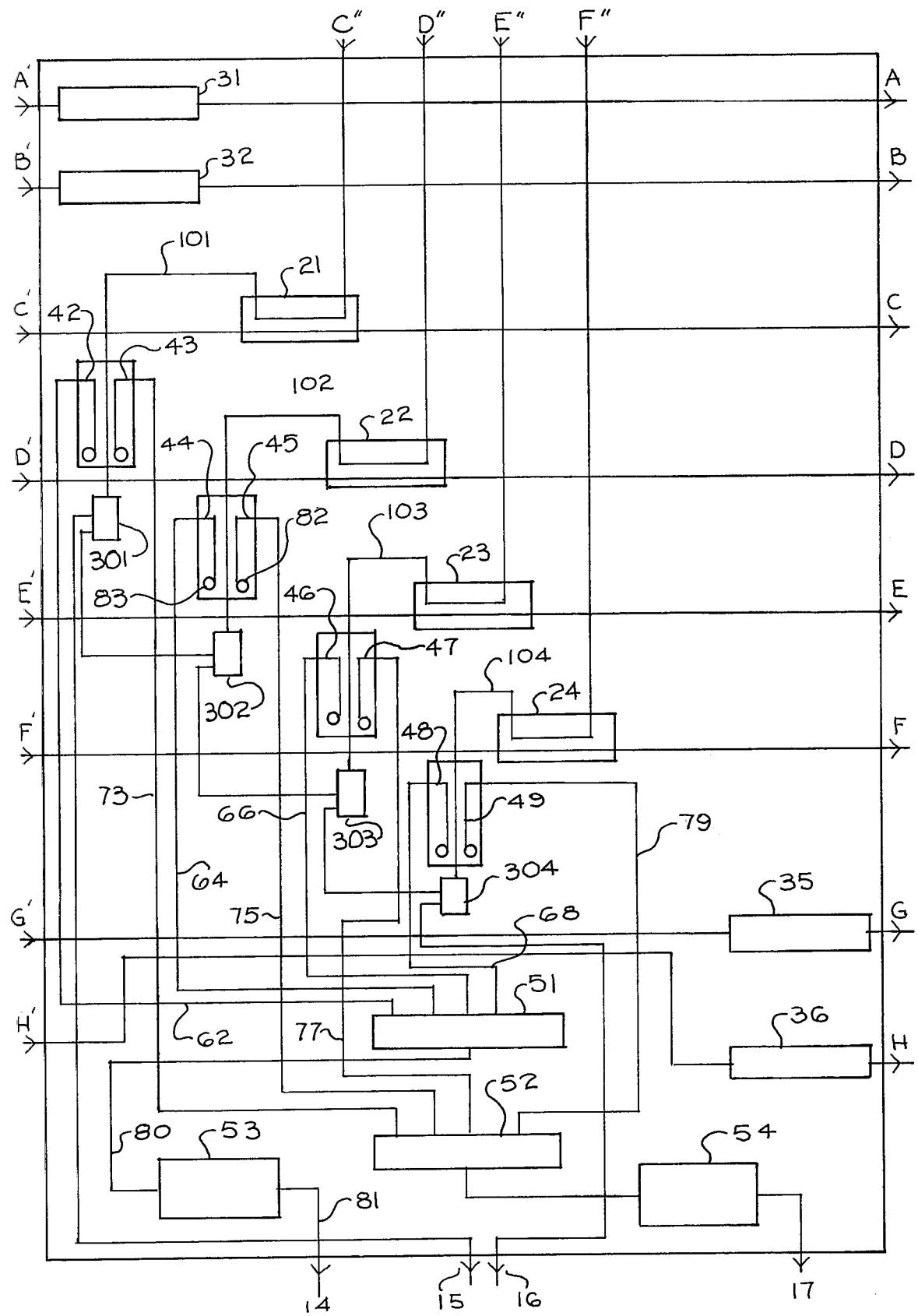
FIG. 6 shows an arrangement for monitoring major faults in the clearance signal distribution system.
Figure 7:
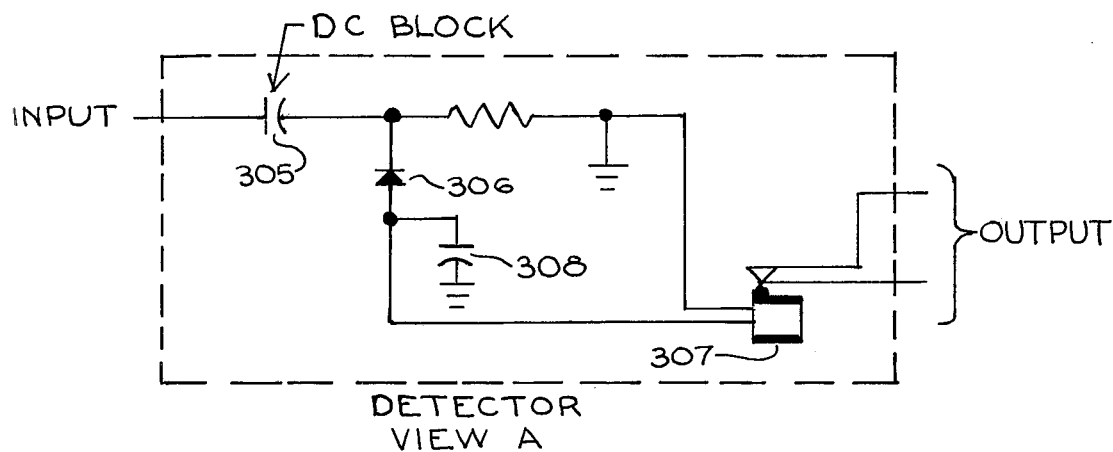
FIG. 7 shows details of certain networks used in FIGS. 6 and 8.
Figure 7:
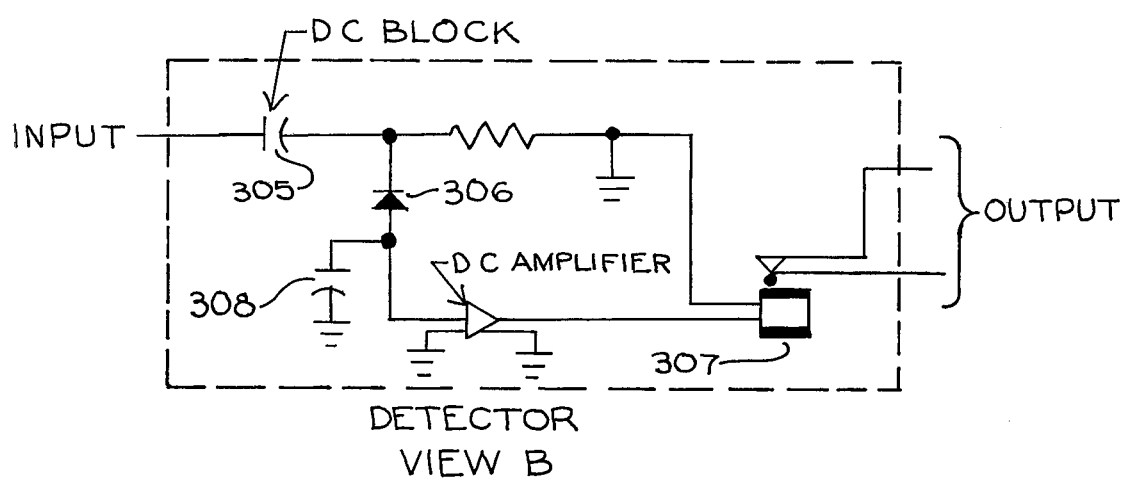
Figure 7:
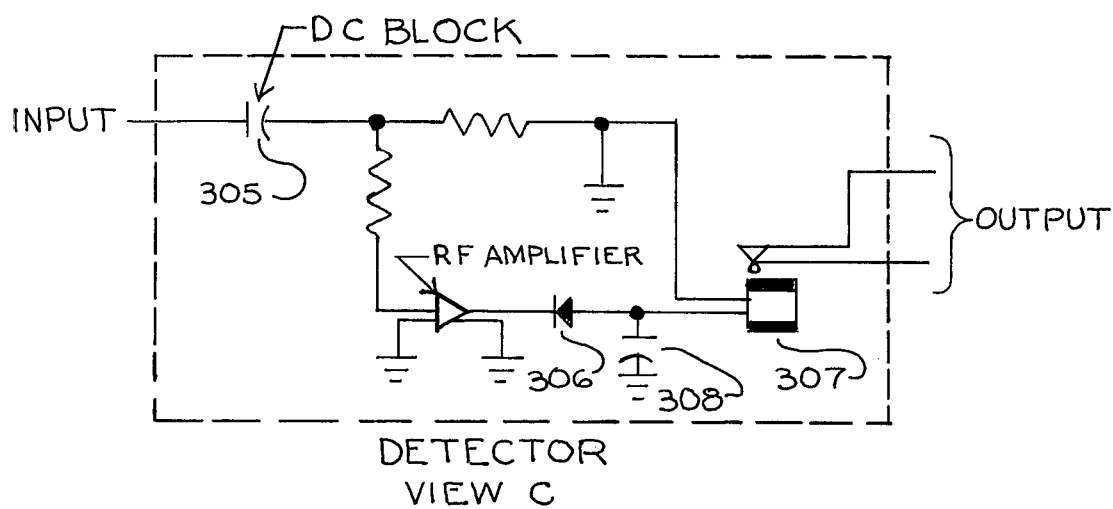

In FIG. 6 is shown a monitoring arrangement with posterior couplers as in FIG. 4, together with the addition of networks 301, 302, 303, 304 which are connected at the ends of such lines as line 101 in place of terminations such as 191 in FIGS. 2 and 4. These sampling and demodulating networks may be similar to those shown in FIG. 7. The simplest of these networks is given in View A of FIG. 7. In this figure, capacitor 305 is used as a direct current blocking device. This capacitor should have sufficient capacitance to present a low impedance of a few ohms or less at localizer frequencies, that is, around 110 MHz. Diode 306 preferably should have a high RF impedance so that it has a small effect on the match of the input line. Capacitor 308 is used as an RF by-pass. The direct current produced as a result of rectification by the diode operates a coil 307 which holds the relay contacts closed under normal operating conditions. As shown in FIG. 6, all such relays are connected in series so that should the detected current through the coil one relay be reduced by, say, a short circuit or an open circuit in one of the transmission lines being monitored, the corresponding relay will open and this will cause an open circuit to be seen between conductors 15 and 16 in FIG. 6.

When the power is too high for the diode to be connected directly to the inner conductor, a resistor of a suitable value may be used to reduce the RF voltage across the diode to a safe value. When the power is too low, the direct current delivered by the detector may be amplified as diagrammatically shown in View B of FIG. 7. A resistor may be used to obtain a small sample of the voltage between the inner and outer conductors and this sample amplified in an RF amplifier and then demodulated to obtain a current suitable for use by a relay coil as indicated in View C in FIG. 7.

As shown in FIG. 6, wires 15 and 16 are a part of the series circuit in which the relays in networks 301, 302, 303, and 304 are connected. Under normal conditions, the circuit between conductors 15 and 16 is closed. Should, however, a fault occur such as, for example, an open circuit in one of the lines supplying the clearance transmitter power to the mixing couplers, the corresponding relays can be made to open and thus will the circuit between conductors 15 and 16 will also open. An "off" type of indication will then be provided for use by external indicating devices in series with an external source of voltage.

Figure 8:
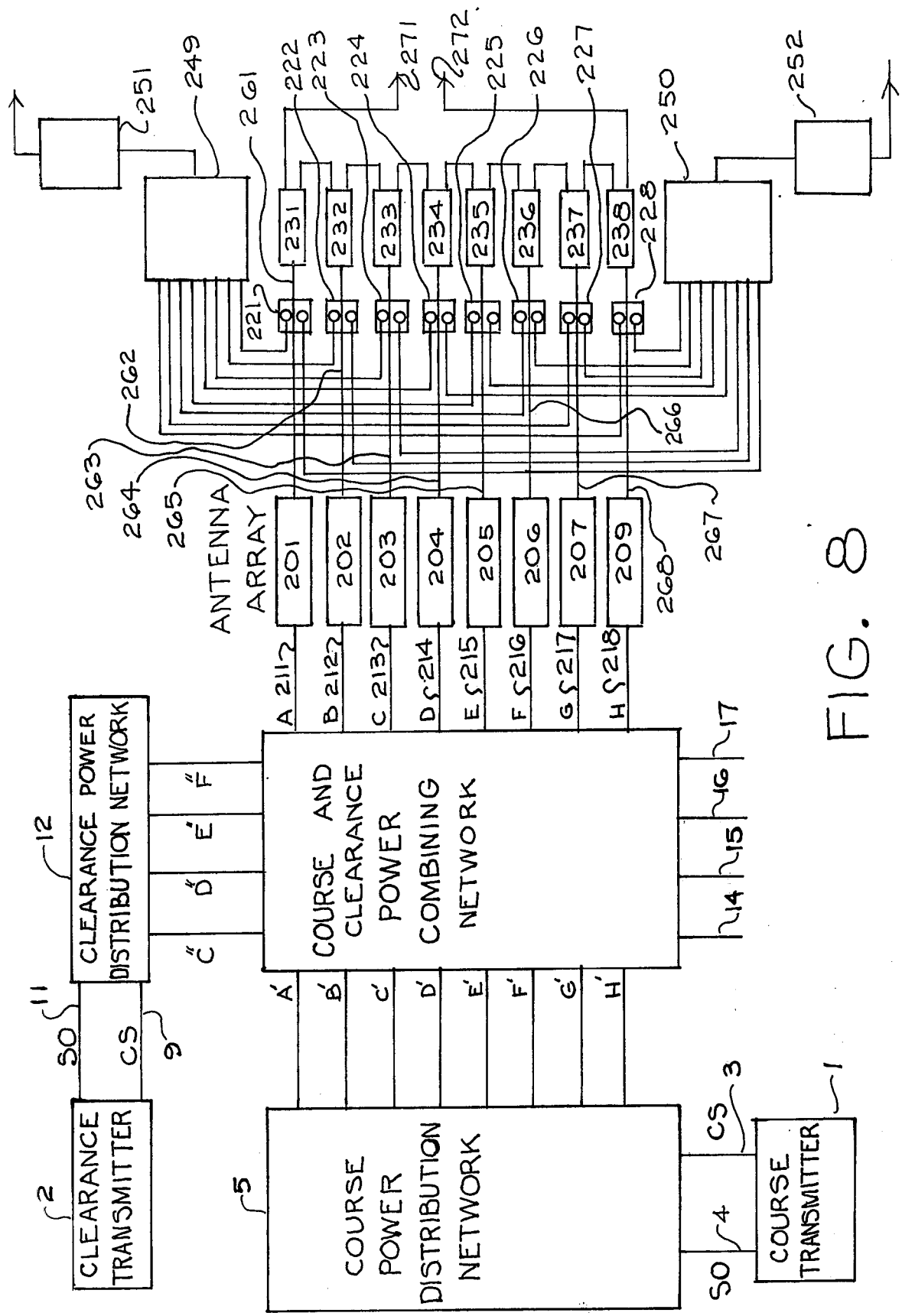
FIG. 8 is a block diagram of the monitoring arrangement used to monitor the overall signals of the combined two frequency localizer.

FIG. 8 shows another block diagram of the two frequency localizer system operating with a single array of radiating elements. These radiating elements are designated by numerals 201, 202 . . . 208. The power to these elements is supplied from the course and clearance combining network 8. The currents in the radiating elements are sampled, for example, by means of coupling loops or by other means, and the samples are then conveyed by the lines to power 221, 222, 223, . . . and 228. These three way dividers may, for example, be of a directional coupler type or a star network of the type shown in FIG. 3. One group of samples is conveyed to networks 231, 232, . . . 238 which may be of the type of the networks shown in FIG. 7. Another group of samples, one from each radiating element, is conveyed to a star network 249, the output of which is demodulated in demodulator 251. The third group of samples is conveyed to star network 250, the output of which is demodulated in demodulator 252. The two star networks 249, 250 are similar to that shown in FIG. 3 except that the number of lines combined in these star networks is 8 instead of 4. They may be designed as explained in connection with FIG. 3.

The path lengths of the sample lines leading from antenna element 201, 202, . . . 208 to star network 249 are so adjusted that each path is equal to all other paths. For example: the electrical length of the path from antenna element 201 to the connector at star network 249 is made equal to the electrical length of the path from antenna element 202 to another connector at the star network 249. These paths are made equal to the other such paths to star network 249. By the length of path here is always meant the electrical length of the path which, of course, includes such phase differences as might be introduced by dividers 221, 222, etc.

The path lengths from antenna elements 201, 202, . . . 208 to star network 250 are also made equal to each other except for the predetermined differences in lengths which are computed in accordance with the principles explained in connection with star network 51 and 52 in FIG. 2.

The demodulated currents delivered by demodulator 251 provide an "on-course" indication. The demodulated currents delivered by demodulator 252 provide an "off-course" indication at an angle $\theta$ which is used in computing the relative electrical lengths from the paths leading from antenna elements 201, 202, . . ., 208 to star network 250.

Conductors 271, 272 provide an indication of an open circuit when the current in any one of the antenna elements drops below a preset value associated with the particular antenna element.

I claim:

1. A monitor system for a two frequency localizer system comprising a clearance signal transmitter, a clearance signal distribution network, a course signal transmitter, a course signal distribution network, means for combining the signals from said distribution networks for energizing elements of a common antenna array, means for monitoring the performance of the system comprising means for sampling said clearance and course signals at points in the system where the magnitude of one of said signals is substantially greater than the magnitude of the other.

2. A monitoring system as in claim 1 wherein said sampling points in the system are located electrically between the clearance distribution network and the combining means.

3. A monitoring system as in claim 1 wherein means for combining the signals include directional couplers, each coupler being fed clearance and course signals and each coupler feeding at least one element of the antenna array.

4. A monitoring system as in claim 1 wherein said sampling means sample predominantely the clearance signal.

5. A monitor for a two frequency localizer system including a clearance signal transmitter, a clearance signal distribution network, a course signal transmitter, a course signal distribution network, means for combining the signals from said distribution networks for energizing elements of a common antenna array comprising:
   a. means for sampling combined currents in individual antennas,
   b. means for dividing each said sample into three parts,
   c. means for monitoring the magnitudes of said individual element currents by using the first set of parts.
   d. means for monitoring the course position by combining the second set of sample parts with equal delays.
   e. means for monitoring the course width by combining the third set of parts through delay lines of graduated lengths to obtain the analog of an off-course signal at an angle to the course located within the main beams of the course signal.
   f. means for monitoring clearance signals comprising sampling means located electrically between the clearance distribution network and the combining network.

* * * * *